UNITED STATES PATENT OFFICE.

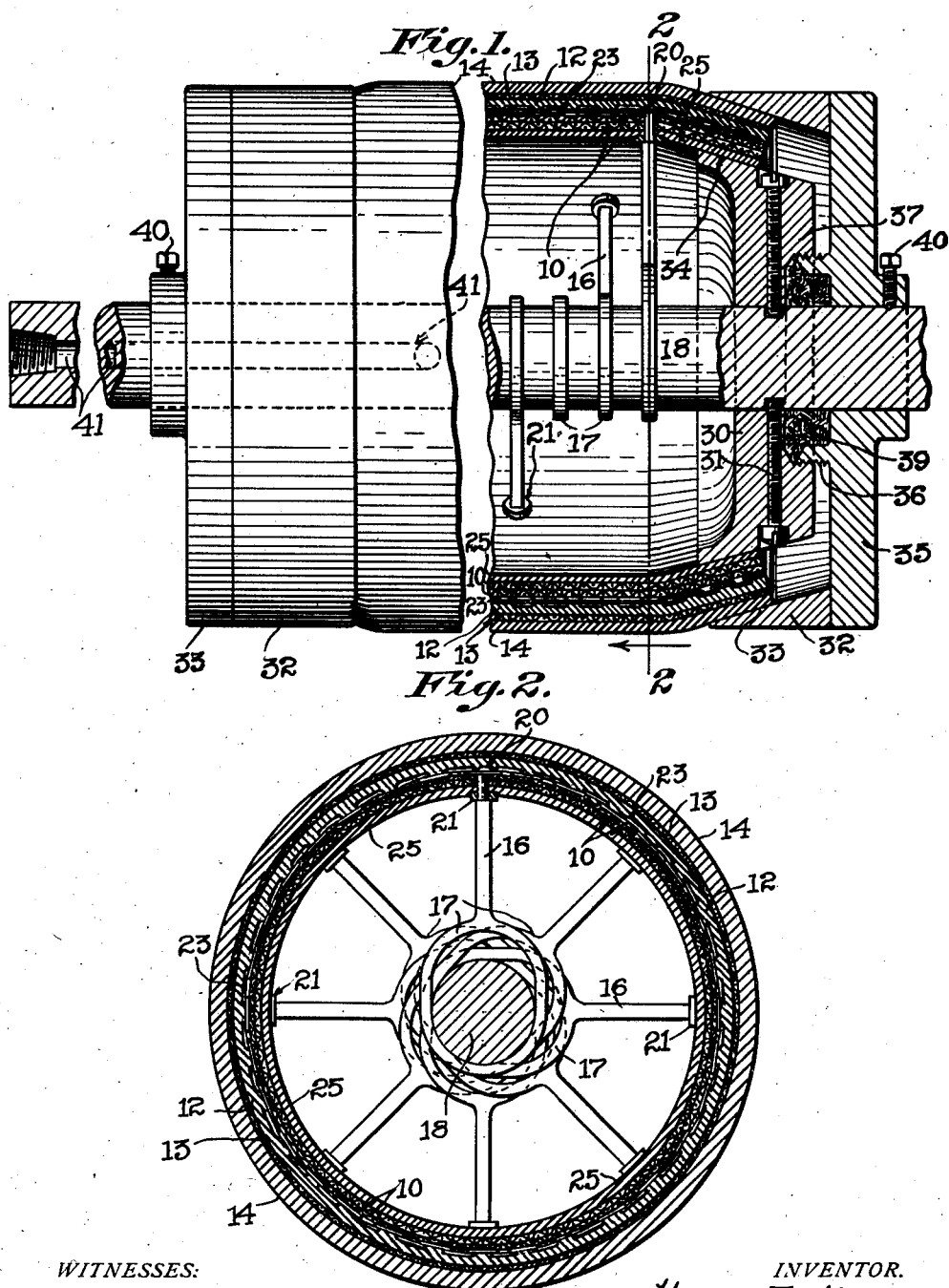

HENRY A. HOLDER, OF LYNN, MASSACHUSETTS, ASSIGNOR TO HOLDER-PERKINS COMPANY, OF WOBURN, MASSACHUSETTS, A CORPORATION OF MASSACHUSETTS.

HOLLOW WORK-SUPPORT FOR LEATHER-WORKING MACHINES.

1,058,749. Specification of Letters Patent. Patented Apr. 15, 1913.

Application filed September 30, 1911. Serial No. 652,067.

*To all whom it may concern:*

Be it known that I, HENRY A. HOLDER, a citizen of the United States, residing in Lynn, county of Essex, and State of Massachusetts, have invented an Improvement in Hollow Work-Supports for Leather-Working Machines, of which the following description, in connection with the accompanying drawings, is a specification, like letters on the drawings representing like parts.

This invention relates to a hollow work-support of that class in which a yielding portion of the work support is limited in its outward movement by means located within the said support.

The present invention has for its object to improve the construction of work-supports of the character described, so as to obtain a work support of increased efficiency and durability without impairing the resiliency of the yielding portion of said support.

The invention is herein shown as embodied in a hollow cylinder or bed roll employed in machines for fleshing and unhairing hides and skins to which the invention is particularly applicable.

Figure 1 is an elevation and section of a bed roll broken away and embodying this invention, and Fig. 2, a cross section on the line 2—2, Fig. 1.

The bed roll herein shown comprises a yielding body or cylindrical portion composed of a plurality of layers as will be described, which are capable of yielding under the influence of external pressure. The cylindrical body portion is preferably provided with one or more layers 10 of canvas or like substantially non-stretchable fibrous material, a layer 12 of rubber covering the outer layer of canvas, a layer 13 of canvas or like substantially non-stretchable material enveloping the rubber layer 12 and compressed thereon, and a substantially thick layer 14 of rubber covering the canvas layer 13.

The layer 13 of non-stretchable fibrous material may be composed of a woven tube or sleeve, or it may be composed of a sleeve or tube formed by winding a strip of fibrous tape upon the rubber layer 12. The layer 10 of canvas has extended through it at various points in its circumference, the arms 16 of metal loops 17, embracing the shaft 18 of the bed roll, and serving to limit the outward movement of the yielding body portion of the roll. Provision is made for firmly securing the arms 16 to the fibrous layer or layers 10, and for this purpose, the arms 16 are provided at their ends with heads 20 and between their ends and the loops 17 with collars 21 fast on said arms.

The heads 20 are formed on the arms 16 after the latter are passed through the fibrous layer 10 from within the roll, and if desired, a metallic layer 23 of links or open mesh wire may be employed and located on the outer surface of the canvas layer 10 between the latter and the rubber layer 12 as herein shown, and the free ends of the arms 16 are extended through the metallic layer before the head 20 is formed thereon. The inner surface of the canvas layer 10 may and preferably will be covered by a layer 25 of rubber into which the collars 21 are embedded as represented herein.

The hollow roll is designed to contain an elastic fluid such as air under pressure, and in order to prevent the air under pressure working its way through the holes in the canvas layer 10 formed for the passage of the arms 16, and thereby form blisters or projections in the external rubber layer 14 of the bed roll, the layer 13 of canvas or like substantially non-stretchable material is employed, which is applied to the rubber layer 12 so as to compress the same and cause the rubber of the layer 12 to seal the openings in the canvas layer 10 around the arms 16 and thus effectively prevent the escape of air to the under side of the outer layer 14 of rubber, and thereby avoid the formation of air blisters or projections on the outer surface of the bed roll.

After the cylindrical body portion of the roll has been formed or built up as described, the rubber layers thereof are vulcanized to firmly unite them and to the canvas or like fabric layers, which are suitably treated to effect this result. The open ends of the cylindrical body portion of the roll are closed air-tight and firmly secured to the shaft 18 as will now be described. To this end, each open end of the body portion overlaps a disk 30 secured to the shaft 18 as by screws 31 or otherwise, and is clamped thereto by a clamping ring 32, said ring having a tapered inner surface 33 and said disk having a tapered outer circumference 34, over which the body portion is drawn down and to which said body portion is secured by the clamping ring 32, which is forced onto the overlapping end of the body portion, by a second disk 35 having an externally threaded boss 36, which engages a threaded recess 37 in the outer surface of the stationary end disk 30, said boss and recess forming a stuffing box for the shaft 18 in which is located suitable packing material 39 to form an air-tight joint around the shaft. The outer disk 35 may be secured in its adjusted position by a set screw 40. The shaft 18 is provided at one end with a central bore or passage 41, which extends longitudinally for a portion of the length of the shaft and then radially so as to communicate with the interior of the bed roll, said passage constituting an inlet for the air under pressure, which may be closed after the fluid forced therein has reached a predetermined pressure, or it may be left open and connected with a suitable pressure supply tank or vessel (not shown).

In operation with the bed roll herein shown, the bladed cylinder of the machine and the bed roll are arranged and adjusted with relation to each other, so as to treat the thin portions of the hide or skin in the proper manner, and when in the operation in which they are used, a thicker portion of the hide or skin is interposed between the tool and bed roll, the portion of the latter in contact with the thicker portion of the hide or skin, yields more than the other portions of the bed roll, and creates an increase of fluid pressure within the bed roll. The increased internal pressure exerts an outward pressure on those portions of the bed roll, which support the thinner portions of the hide or skin, and also upon other portions of the bed roll, which are uncovered by the hide or skin, but the movement of these portions of the bed roll by the increased internal pressure is limited by the metal loops 17 engaging the shaft 18, whereas if said parts were not thus restrained from outward movement, the thinner portions of the hide would be pressed outwardly toward the operating tool, which, in the case of a fleshing machine, would remove too much of the flesh at the thin portions of the hide or skin, and in the case of an unhairing machine would scrape and injure the grain of the hide or skin, while those portions of the bed roll which are uncovered by the hide or skin would be liable to be cut by the bladed cylinder. By means of the present invention, these objectionable features are overcome and both the thick and thin portions of the hide or skin are subjected to the same or substantially the same pressure and at the same time, the formation of air blisters or projections in or under the outer layer of the bed roll is avoided, which, if formed, would be cut by the bladed cylinder, with the result that the bed roll would be rendered useless for the purpose intended.

In the present instance, I have illustrated the hollow work support in the form of a roll, but it is not desired to limit the invention in this respect. So also, it is not desired to limit the invention to the particular form of means within the hollow work support for arresting the outward movement of the yielding portion thereof.

The metallic layer 23 of open mesh serves to strengthen the body portion of the roll and while I may prefer to use it, it may be omitted without materially impairing the usefulness of the roll. So also I prefer to use rubber layer 25, but it may be omitted and the compressed rubber layer 13 alone depended upon to prevent the escape of air through the body portion.

It will be understood, that when the invention is embodied in a work-support in the form of a roll as herein shown, the layers comprising the body portion of the roll are cylindrical in form.

Claims.

1. The combination with a shaft, a bed roll mounted thereon and having a yielding portion comprising a layer of rubber under compression interposed between layers of fibrous material, and an outer layer of rubber vulcanized thereto, devices within the body portion secured to the inner fibrous layer on opposite sides thereof and coöperating with said shaft to limit the outward movement of the body portion, and closures for the open ends of said body portion comprising a disk fast on said shaft and having a tapered outer surface, a clamping ring having a tapered inner surface, and a second disk to engage said clamping ring and force it toward the first-mentioned disk, substantially as described.

2. The combination with a shaft, a bed roll mounted thereon and provided with a yielding body portion comprising a layer of rubber under compression interposed between layers of fibrous material, and an outer layer of rubber vulcanized to the said layers, and devices within said body portion secured to the inner layer of fibrous material on opposite sides thereof and coöperating with said shaft to limit the outward movement of said body portion under the influence of fluid pressure within the roll, substantially as described.

3. The combination with a shaft, a bed roll mounted thereon and provided with a yielding body portion comprising a layer of fibrous material, a layer of open mesh metal enveloping said fibrous layer, a layer of rubber enveloping said metallic layer, a layer of fibrous material enveloping said rubber layer and compressing the same, an outer layer of rubber enveloping the compressing layer of fibrous material and vulcanized thereto, and devices within the roll extended through said metallic layer and the fibrous layer enveloped thereby and secured to both, and coöperating with said shaft to limit the outward movement of said yielding body portion, substantially as described.

4. The combination with a shaft, a hollow fluid-tight bed roll mounted thereon and containing an elastic fluid under pressure and having a yielding portion comprising a layer of rubber under compression between layers of fibrous material, and an outer layer of rubber vulcanized thereto, of devices located within said roll and engaging said shaft and having their outer ends extended through the inner fibrous layer and secured to said yielding body portion to limit the movement of the latter under the influence of internal pressure, substantially as described.

5. The combination with a shaft, a bed roll mounted thereon and provided with a yielding body portion comprising a layer of meshed fibrous material, a layer of rubber on the inner surface of said fibrous layer, a layer of rubber on the outer surface of said fibrous layer, a layer of meshed fibrous material enveloping said second-mentioned layer of rubber, and a layer of rubber enveloping the last mentioned fibrous layer and vulcanized thereto, and devices within said body portion having arms extended through the innermost layer of rubber and the fibrous layer contacting therewith, and means on said arms on opposite sides of the fibrous layer through which they are extended to secure the arms to said fibrous layer, and means attached to said arms and coöperating with said shaft, substantially as described.

6. The combination with a hollow fluid-tight work-support containing an elastic fluid under pressure and having a yielding portion comprising layers of metallic and non-metallic material, of devices secured to the metallic layer and extended into the hollow work-support and means within the latter with which said devices coöperate, to limit the outward movement of said yielding portion under the influence of internal pressure, substantially as described.

7. The combination with a hollow, fluid-tight work-support containing an elastic fluid under pressure and having a yielding portion comprising a layer of fibrous material interposed between layers of rubber, of devices located within said support and extended through the layer of fibrous material to limit the outward movement of the yielding portion under the influence of internal fluid pressure, the opening in the fibrous layer through which said devices are extended being sealed by the inner and outer layers of rubber.

In testimony whereof, I have signed my name to this specification in the presence of two subscribing witnesses.

HENRY A. HOLDER.

Witnesses:
JAS. H. CHURCHILL,
J. MURPHY.